US010394721B2

(12) United States Patent
Panesar et al.

(10) Patent No.: US 10,394,721 B2
(45) Date of Patent: Aug. 27, 2019

(54) INTEGRATED CIRCUIT SECURITY

(71) Applicant: UltraSoC Technologies Ltd., Cambridge (GB)

(72) Inventors: Gajinder Panesar, Bristol (GB); Rupert Baines, Bath (GB); Iain Robertson, Bedford (GB)

(73) Assignee: UltraSoc Technologies Ltd., Cambridge (GB)

( * ) Notice: Subject to any disclaimer, the term of this patent is extended or adjusted under 35 U.S.C. 154(b) by 144 days.

(21) Appl. No.: 15/365,686

(22) Filed: Nov. 30, 2016

(65) Prior Publication Data

US 2017/0153988 A1 Jun. 1, 2017

(30) Foreign Application Priority Data

Nov. 30, 2015 (GB) .................................. 1521070.1

(51) Int. Cl.
*G06F 12/14* (2006.01)
*G06F 21/56* (2013.01)

(52) U.S. Cl.
CPC ...... *G06F 12/1416* (2013.01); *G06F 12/1408* (2013.01); *G06F 21/562* (2013.01); *G06F 21/566* (2013.01); *G06F 2212/1052* (2013.01); *G06F 2212/402* (2013.01)

(58) Field of Classification Search
None
See application file for complete search history.

(56) References Cited

U.S. PATENT DOCUMENTS

2007/0234072 A1* 10/2007 Kudelski ................. G06F 21/53
713/190
2010/0088447 A1* 4/2010 Soh ........................ G06K 19/07
710/301
2012/0146658 A1* 6/2012 Rentschler .......... G06F 11/3632
324/537

FOREIGN PATENT DOCUMENTS

EP 1619572 1/2006
EP 1619572 A1 * 1/2006 ........... G06F 21/554

* cited by examiner

*Primary Examiner* — Tracy C. Chan
(74) *Attorney, Agent, or Firm* — Weide & Miller, Ltd.

(57) ABSTRACT

An integrated circuit, having a security supervision system, comprising a plurality of functional circuit blocks interconnected to collectively performing data processing tasks, one or more communication adaptors, having: (i) a hardware interconnection to the functional circuit blocks, whereby the communication adaptor senses the state and/or activity of the functional circuit block; (ii) memory storing definitions of state and/or activity of functional circuit block and actions for each definition; and (iii) processing circuitry comparing the state and/or activity of the functional block with each definition, such that when state and/or activity of the functional block corresponding to a stored definition is detected, perform the corresponding action. The memory stores a definition of state and/or activity characteristic of insecure operation of the functional circuit block and a corresponding action to partially disabling the functional circuit block and/or (ii) causing a message to be transmitted to a destination off the integrated circuit.

16 Claims, 4 Drawing Sheets

INTEGRATED CIRCUIT SECURITY

FIELD OF THE INVENTION

This invention relates to security features of integrated circuits.

BACKGROUND

In many systems such as mobile phones, cellular base stations, authentication tokens and banking data centres it is important to maintain security over the operating environment of data processors.

A number of measures are available to help maintain the security of data processing systems. For example, firewalls can be implemented to block unwanted communication traffic, monitoring systems such as anti-virus software can be used to detect malicious activity and operating systems can be configured to partition memory so that a process running on a computer can only access areas of memory that are designated to it. These systems suffer from a number of problems. First, many modern computing architectures are of the system-on-chip (SoC) design, in which multiple data processing entities are implemented on a single integrated circuit chip. This can improve processing speed and efficiency because the entities can communicate between each other without data leaving the chip. However, since such data does not leave the chip it is difficult to monitor the data using existing security systems: for example to check for attempts to hack the system by enabling a process to gain access to data that it is not authorised to access or manipulate the operation of another process. Second, because many security systems are transparent to the end user but are implemented remotely from the user's data processing device it is difficult for the user to be certain that the security systems are operating effectively. For example, when a user is communicating normally through a firewall the user has no way of knowing whether the firewall is actually operating to block any malicious communications.

Some approaches involve the use of a secure monitor or hypervisor implemented in software. The hypervisor checks for a non-secure entity attempting to access a secure entity. The hypervisor resides in the target system's memory space. Other systems involve a software agent which runs in the background and scans files and other objects for data that matches known signatures of malware. These approaches have the disadvantage of consuming resources of the target system in such a way as to reduce the system's performance for user-level tasks. They may also be obtrusive to the user.

Further examples of approaches to securing data processors are discussed in "An Analysis of Secure Processor Architectures", S. Chhabra et al., Transactions on Computations Sciences VII, Lecture Notes in Computer Science, Vol. 5890, pp 101-121 (www.ece.ncsu.edu/arpers/Papers/tcs-survey.pdf).

ARM TrustZone is a security system that is implemented partly in hardware and partly in software. An integrated circuit's interconnects are configured to be capable of supporting a sideband signal for signalling a processor to switch between secure and non-secure domains. Software is then used to manage the integrated circuit so as to transition the processor between operating in a normal (non-secure) environment and a secure environment. Because systems of this nature rely on software running on the integrated circuit it can be difficult to guarantee that the operations of the integrated circuit are fully supervised by the security system.

The UEFI secure boot protocol blocks the execution of operating system loaders that do not have a valid cryptographic signature. This protocol can be used to enforce the loading of a trusted operating system, but it does not directly enforce the security of higher level operations as would be required if it were to supervise the security of arbitrary software running on the operating system.

GB 2 500 441 and GB 2 501 333 describe aspects of systems for assisting in the debugging of an SoC. Such debugging systems can monitor transactions between processing entities on the SoC and can provide reports to an on-chip or off-chip analysis unit when transactions matching predetermined criteria take place.

There is a need for an improved mechanism for securing the operation of data processing devices.

SUMMARY OF THE INVENTION

According to one approach there is provided an integrated circuit having a security supervision system, the integrated circuit comprising: a plurality of functional circuit blocks mutually interconnected so as to be capable of collectively performing data processing tasks; one or more communication interfaces, the or each communication interface having: (i) a hardware interconnection to at least one of the functional circuit blocks, whereby the communication interface is capable of sensing the state and/or activity of the said functional circuit block; (ii) memory for storing definitions of state and/or activity of the said functional circuit block and actions corresponding to each definition; and (iii) processing circuitry for comparing the state and/or activity of the said functional block with each definition, the processing circuitry being configured to, when state and/or activity of the said functional block corresponding to a stored definition is detected, perform the corresponding action; the memory being configured to store a definition of state and/or activity characteristic of insecure operation of the said functional circuit block and a corresponding action that is one of (i) at least partially disabling the said functional circuit block and (ii) causing a message to be transmitted to a destination off the integrated circuit.

Multiple actions may be stored as corresponding to a particular state/activity definition, and may then be actioned in the event of such a state or activity being detected.

The processing circuitry of the or each communication interface may be implemented in hardware operating in a separate clock domain to the or each functional circuit block to which the communication interface is connected.

The processing circuitry of the communication interface may be implemented in separate hardware from the functional circuit blocks.

The processing circuitry of the communication interface may be implemented in hardware that is distinct from any hardware on which arbitrary software can run.

The integrated circuit may comprise an access controller. The access controller may be capable of configuring the memory of a communication interface. The access controller may be arranged to: receive a command to configure the memory of a communication interface; attempt to authenticate that command; and configure the memory of the communication interface only if the command is successfully authenticated, for example in response to it determining that the command has been successfully authenticated.

The access controller may be arranged to decrypt the command.

The integrated circuit may be configured so that the memory of the communication interface is configurable only by the access controller.

The integrated circuit may be arranged to encrypt the said message.

The integrated circuit may comprise multiple communication interfaces and a supervisory node coupled for communication with each of the communication interfaces to receive messages from the communication interfaces indicative of state and/or activity of the functional circuit blocks, the supervisory node comprising (i) memory for storing definitions of state and/or activity of multiple functional circuit blocks and actions corresponding to each definition; and (ii) processing circuitry for comparing the state and/or activity indicated by the said messages with each definition, the processing circuitry being configured to, when it detects that state and/or activity indicated by the said messages corresponds to a stored definition, perform the corresponding action; the memory being configured to store a definition of state and/or activity characteristic of insecure operation of the said functional circuit blocks and a corresponding action that is one of (i) at least partially disabling one or more of the said functional circuit blocks and (ii) causing a message to be transmitted to a destination off the integrated circuit.

The functional circuit blocks may comprise or may be one or more of a microprocessor, a memory and a communication interface.

The state and/or activity characteristic of insecure operation of the said functional circuit block may be an attempt to read or write a memory location identified by a predetermined logic.

The state and/or activity characteristic of insecure operation of the said functional circuit block may be an attempt by a process having a predetermined characteristic to read or write a predetermined memory location.

The state and/or activity characteristic of insecure operation of the said functional circuit block may be that software stored for execution on the functional circuit block matches or fails to match one or more predetermined criteria.

The state and/or activity characteristic of insecure operation of the said functional circuit block may be that the environment of the integrated circuit matches or fails to match one or more predetermined criteria.

The integrated circuit may store data associating at least one memory area with at least one process capable of being supported by the functional circuit block. The state and/or activity characteristic of insecure operation of the said functional circuit block may be an attempt by such a process to read or write to that memory area.

The said memory may be configured to store a definition of state and/or activity characteristic of secure operation of the said functional circuit block and a corresponding action that is to log activity of the said functional circuit block subsequent to that action.

The state and/or activity characteristic of insecure operation may be defined by data stored on the integrated circuit. That data may be stored in non-volatile memory. That data may be stored in read only memory. That data may indicate the state and/or activity characteristic of insecure operation explicitly, by virtue of it specifying characteristics of that state, or implicitly, by virtue of it specifying characteristics of states and/or activities that are deemed not to be characteristic of insecure operation.

BRIEF DESCRIPTION OF THE DRAWINGS

The present invention will now be described by way of example with reference to the accompanying drawings. In the drawings.

DETAILED DESCRIPTION

Figure 1:
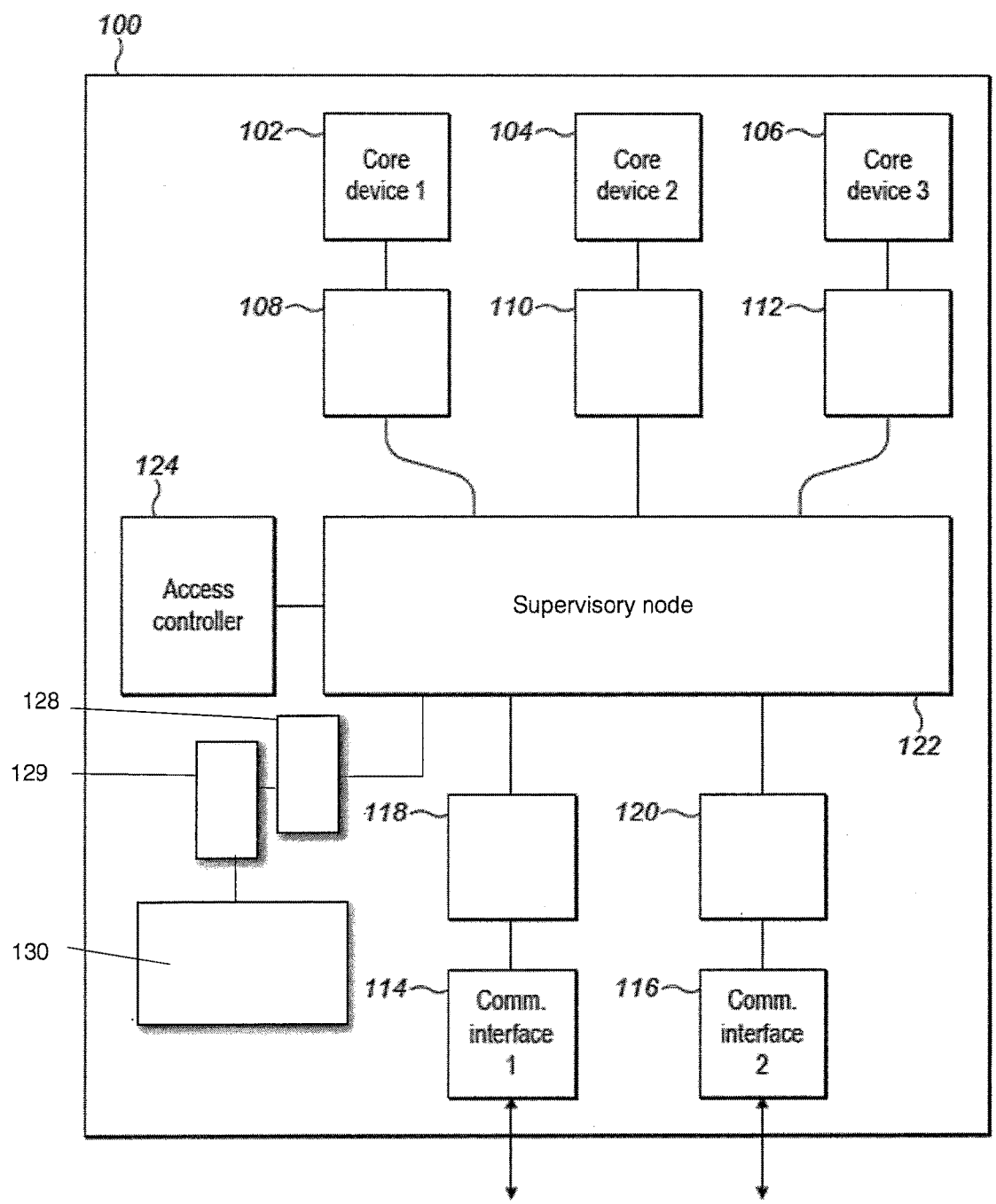
FIG. 1 illustrates an architecture for a system-on-chip integrated circuit.

FIG. 1 shows the general architecture of a system-on-chip integrated circuit. The boundary of the integrated circuit is indicated at 100. The components within the integrated circuit may be implemented on a single semiconductor substrate. The integrated circuit comprises a number of core functional entities 102, 104, 106, 118, 120. Each core functional entity may be a processing entity such as a microprocessor: for example a DSP (digital signal processor), video processor, applications processor, or graphics processor; a peripheral device such as a memory block, a memory interface, an off-chip communication interface; or another functional circuit block. In FIG. 1, core functional entities 114 and 116 are communication interfaces which allow the integrated circuit to transmit and/or receive signals to and/or from external entities. Examples of the external communication protocols that could be used are Ethernet, USB, JTAG, PCIe, CAN, RS232, WiFi, Bluetooth and cellular wireless protocols. FIG. 1 also shows an internal subsystem 130, which may be a composite system comprising one or more processors, memory, communication interfaces and so on. The internal subsystem is implemented on the same integrated circuit as the other components.

The core functional entities are interconnected by one or more buses or other communication mechanisms, in the normal way. Additionally, in the architecture of FIG. 1, for each core entity there is a respective communication adaptor 108, 110, 112, 118, 120. Each communication adaptor interfaces between its respective core entity and a supervisory node 122. In this example the supervisory node 122 operates as a central shared communication hub between communication adapters; but in other architectures, for example as described below in relation to FIG. 4, the communication adapters could be directly interconnected by a communication structure, such as a bus or a mesh network, that does not pass through the supervisory node and/or that is not switched by the supervisory node. FIG. 1 also shows a communication adapter 128 which interfaces between the supervisory node 122 and a communication adapter 129 which implements a communication link to the internal subsystem 130. The core entities 102, 104 etc. can communicate with the internal subsystem via the communication adapter 129, but—although the internal subsystem is on the same integrated circuit—the internal subsystem is outside the security domain implemented by the supervisory node 122.

An access controller 124 is coupled to the supervisory node. The access controller controls access by external entities to the configuration of the supervisory node.

The supervisory node and the communication adaptors collectively function as a logical monitoring system which monitors, and can exert control over, the operation of the integrated circuit. The operation of the logical monitoring system is configured by the access controller 124.

The logical monitoring system can operate in one or both of a debugging mode and a security mode.

In the debugging mode the communication adaptors are is configured with a set of debugging triggers and filters. The debugging triggers and filters represent characteristics of traffic between the core entities or represent the state of the core entities. When a communication adaptor detects traffic or state that matches one of the debugging triggers assigned to it, it begins logging traffic between the core entities or performing another function to support debugging. In the case of the logging function, for example, the adaptor logs details of traffic between the nodes that matches one or more of the filters, or logs the configuration of the system when the state was detected. The logged details can then be stored, for instance in memory internal to the supervisory node 122, or can be transmitted off the integrated circuit for storage or analysis by an external device. The analysis could alternatively be performed on the integrated circuit itself. In this way, the monitoring system can capture traffic between the core entities of the integrated circuit so that that traffic can be reviewed for the purpose of debugging the chip, and can capture information such as the time when a particular state was encountered.

In the security mode the communication adaptors are configured with a set of security triggers and for each security trigger a corresponding action. Each security trigger represents characteristics of traffic between the core entities, or state of a core entity. The security triggers can be predefined so as to match anticipated characteristics of malicious data traffic or a state that is consequent to malicious activity having been attempted. Each action represents an action that the communication adaptor in question should take on detecting traffic having the characteristics of the respective trigger. Examples of possible actions include blocking the traffic, transmitting an alert to the supervisory node or another entity on the integrated circuit, or to an entity off the integrated circuit, and disabling part or all of the integrated circuit. When operating in the security mode the communication adaptors monitor traffic between the core entities for traffic matching a security trigger, and the communication adapters monitor the state of the core entities for a match to a stored state-related trigger. When such traffic or state is detected the communication adaptor that detected the traffic performs the corresponding action. In this way, the monitoring system can block unwanted activities or alert a user to unwanted activities. Since the supervisory node and the communication adaptors are implemented in the hardware of the integrated circuit the monitoring system can be viewed as providing reliable protection against malicious interference with the desired operation of the integrated circuit.

The integrated circuit of FIG. 1 will now be described in more detail.

Figure 4:
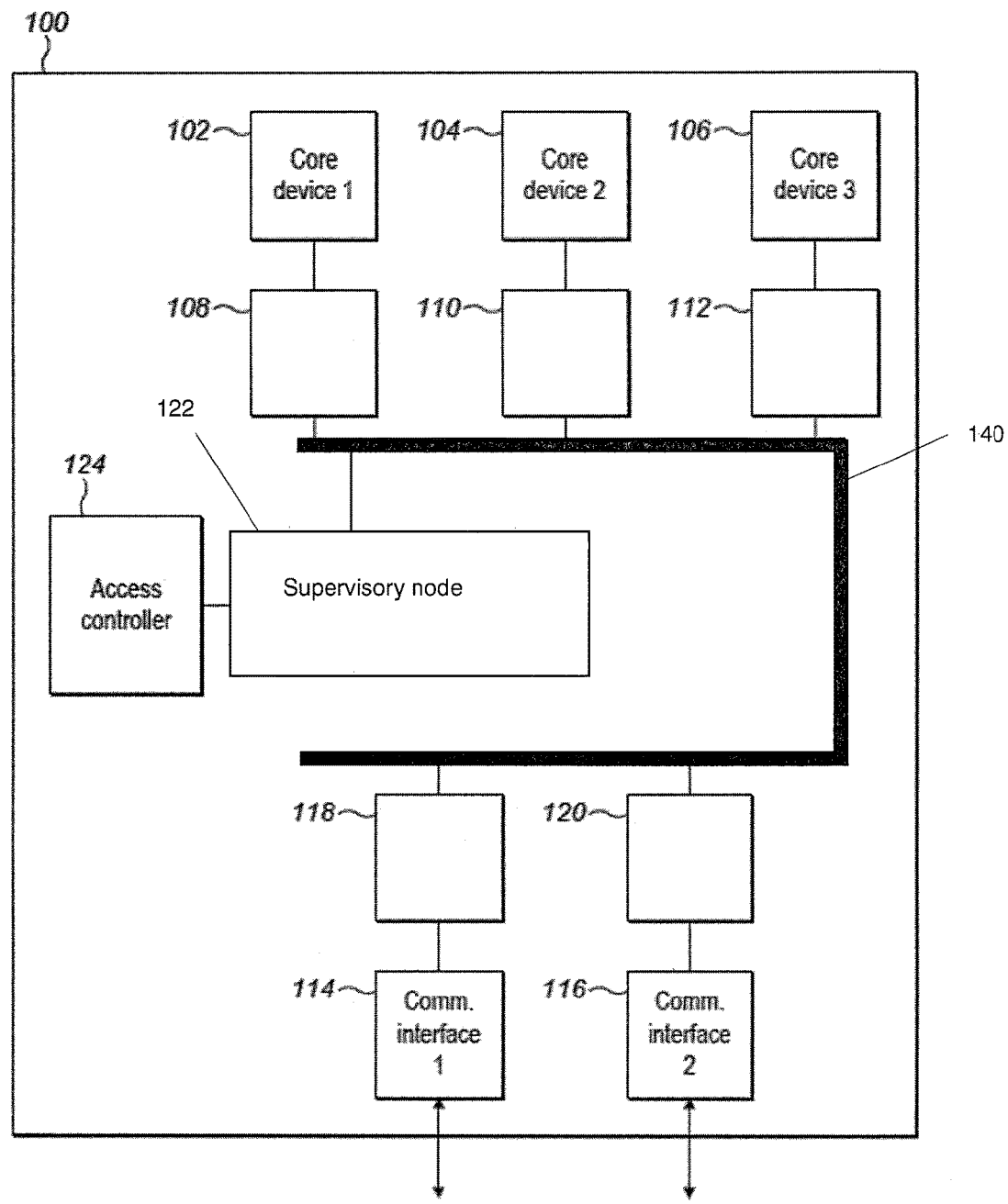
FIG. 4 shows an alternative communication mechanism between elements of a monitoring system.

On a typical complex integrated circuit there will be multiple distinct functional nodes. The functional nodes could, for example, be general purpose processing cores, specialised graphics or video processors, memory, communication interfaces, hardware drivers or hardware state engines. These functional nodes correspond to the core functional entities 102, 104, 106, 114, 116 of FIG. 1. In the present architecture the communication adaptors 108, 110, 112, 118, 120 are located between their respective core functional entity and the supervisory node 122. In the example of FIG. 1 the supervisory entity acts as a hub for supervisory communication messages to and from the communication adapters. An alternative architecture is shown in FIG. 4. Each communication adapter is configured so that it can monitor at a low level the state of and the operational traffic to and from its respective core functional entity. When one core functional entity transmits data to or receives data from another core functional entity that communication can be detected by the corresponding communication adaptor. That communication adaptor can check whether the communication matches one of its stored triggers, and if so take the appropriate debugging or security action. Similarly, each communication adaptor can sense the state of the corresponding core functional entity. That communication adaptor can check whether the state matches one of its stored triggers, and if so take the appropriate debugging or security action.

Figure 2:
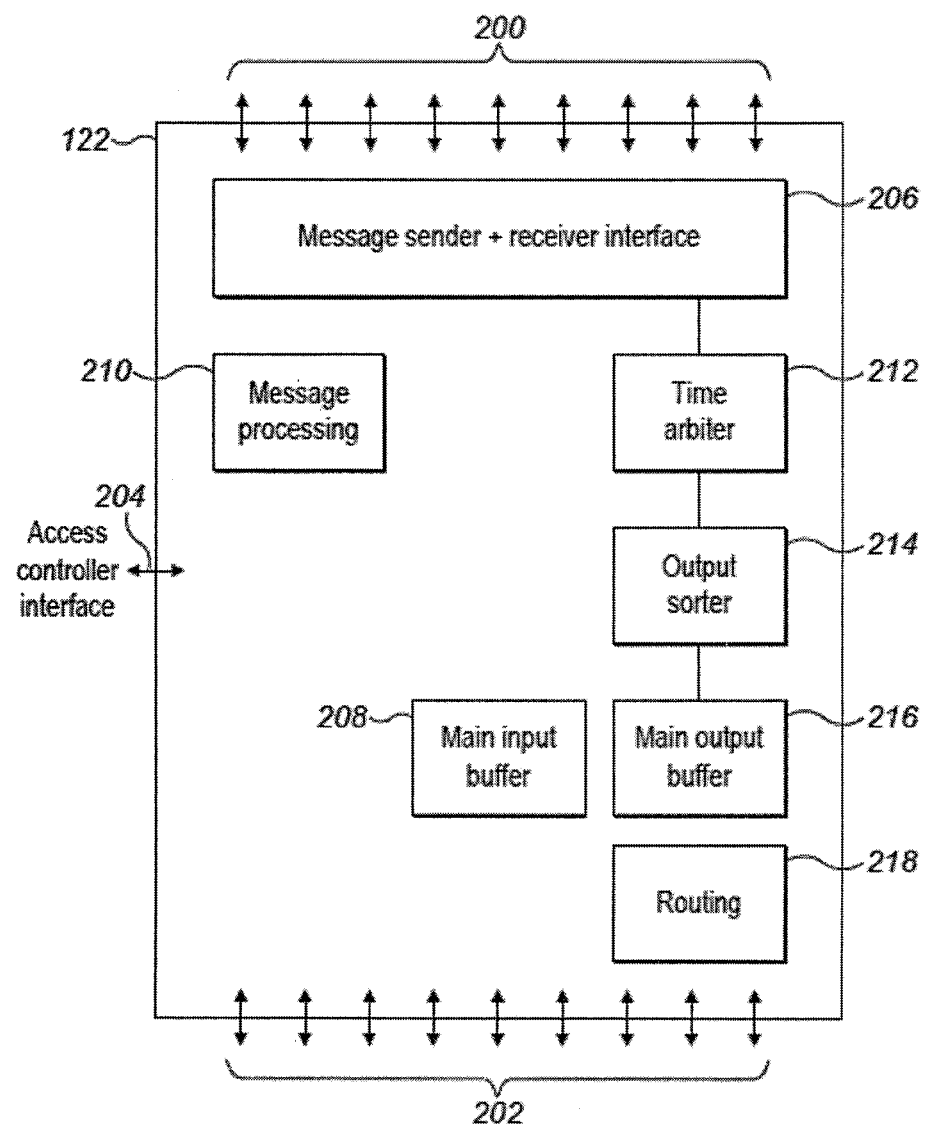
FIG. 2 shows in more detail the supervisory unit of the architecture of FIG. 1.

FIG. 2 illustrates an exemplary architecture for the supervisory node 122. The supervisory node 122 has a plurality of interfaces 200, 202 for interfacing to the communication adaptors 108 etc. and an interface 204 for interfacing to the access controller 124. Preferably, the communication adaptors and the access controller communicate with the supervisory node using packet messages. A message received at one of the interfaces 200, 202 may represent logging data to be stored in the supervisory node. Data to be stored is stored in main input buffer 208. Other messages received by the supervisory node may need to be routed on to another entity, for example to another communication adapter. Those messages are processed by message processing module 210 to modify their destination address, as will be described in more detail below, and then re-transmitted over the appropriate interface 200, 202. When the integrated circuit is in normal operation the supervisory node may receive several messages over a very short time period from several different sources, for example the supervisory node may receive messages from several of the communication adaptors in close succession. Suitably, the communication adaptors time-stamp the messages that they send to the supervisory node. The supervisory node can then determine the time order of these messages at time arbitrator 212, and reorder the messages into time order at output sorter 214. Following buffering at main output buffer 216, the supervisory node can then route 218 the messages on towards their destination. For example, in the case that the supervisory node receives messages from several communication adaptors, the supervisory node may output the trace data in time sorted order to another communication adaptor for communication to an off-chip debugger.

The communication adaptors 108 etc. act to interface between the peripheral circuits 102 etc. and the supervisory node 122. The communication adaptors are configured to support debugging the peripheral circuits to which they are attached, by generating debug information which can be streamed to the supervisory node; and to support security operations in relation to the peripheral circuits to which they are attached, by monitoring communications to and from the respective peripheral circuit and the state of the respective peripheral circuit and generating monitoring information which can be streamed to the supervisory node. In practice the debug information and the monitoring information could be indistinguishable in format: the communication adaptors could simply be configured to send information to the supervisory node when communications matching one or more predetermined characteristics are detected, and the supervisory node could then determine whether to action that for a debugging or security purpose, depending on the nature of the received data.

The internal structure of the communication adaptors may differ depending on, for example, whether they are configured to passively or actively observe the attached peripheral circuit. A communication adaptor which passively observes an attached peripheral circuit is limited to analysing the output of that peripheral circuit. Conversely, a communication adaptor which actively observes an attached peripheral circuit may analyse the output of the peripheral circuit, and additionally may control the peripheral circuit to modify its operation. For example, the communication adaptor may control the peripheral circuit to slow down the speed at which the peripheral circuit operates or to stop the processor of a peripheral circuit in order to read register values and then start the processor again.

Figure 3:
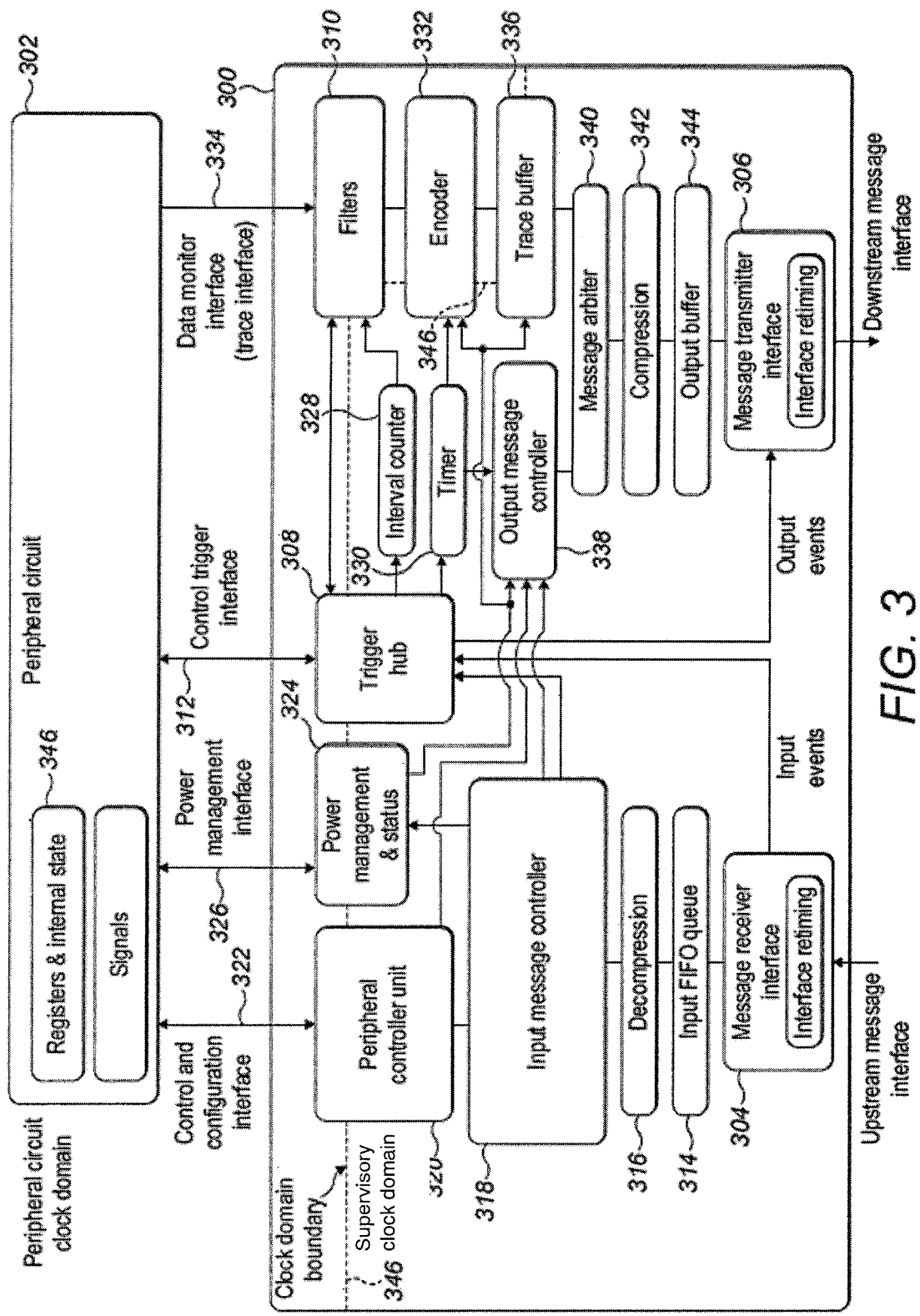
FIG. 3 shows in more detail a communication adaptor of FIG. 1.

FIG. 3 illustrates an exemplary active communication adaptor 300 and attached peripheral circuit 302. The peripheral circuit may operate at a higher frequency than the supervisory node. For example, the peripheral circuit may operate at 1 GHz, whereas the supervisory node may operate at 300 MHz. The communication adaptor 300 interfaces between the two operating frequencies, and hence partially operates at the peripheral circuit frequency and partially operates at the supervisory node frequency. These different frequencies are referred to on FIG. 3 as the peripheral circuit clock domain and the supervisory clock domain. The boundary between the peripheral circuit clock domain and the supervisory clock domain is illustrated by dashed line 346. FIG. 3 illustrates that the peripheral circuit and the interfaces between the communication adaptor unit and the peripheral circuit all operate in the peripheral circuit clock domain. The filters, encoder, trace buffer, peripheral controller unit, power management and status module and trigger hub all operate on the clock domain boundary and hence perform synchronisation between the clocking frequencies. The rest of the communication adaptor operates in the supervisory clock domain.

The communication adaptor 300 receives messages from the supervisory node at message receiver interface 304 and sends messages via message transmitter interface 306 to the supervisory node. Suitably, messages are retimed on being received by message receiver interface 304 and on being sent by message transmitter interface 306. The messages received by the communication adaptor are either (i) control messages to control the operation of the communication adaptor or peripheral circuit, or (ii) event messages to trigger the communication adaptor or peripheral circuit to operate in a particular way as a result of an event occurring elsewhere in the supervisory architecture. The messages sent by the communication adaptor are either (i) control messages to control the operation of other entities, (ii) event messages to trigger other entities to operate in a particular way as a result of an event occurring at the communication adaptor unit, or (iii) trace data. Trace data is output of the peripheral circuit that the communication adaptor has recorded passively whilst the peripheral circuit continues executing.

Event messages are considered to be time-critical, and hence if an event message is received by the message receiver interface 304 it is passed directly to the trigger hub 308. If the event message instructs the communication adaptor to alter which data is being collected by the communication adaptor by modifying the adaptor's filters then the trigger hub triggers a reconfiguration of the filters 310 in order to comply with the event message instruction. For example, in the case that the event message instructs the communication adaptor to search for a particular condition in the output of the peripheral circuit, the trigger hub triggers the match filters to reconfigure to search for that particular condition in the output of the peripheral circuit, and to inform the supervisory unit of a match if found. If the event message instructs the communication adaptor to alter the operation of the peripheral circuit, then the trigger hub instructs the peripheral circuit accordingly over control trigger interface 312. For example, the event message may instruct the communication adaptor to stop the peripheral circuit. Further examples of event messages are ones to initiate the analysis of data from the peripheral circuit, to stop the analysis of data from the peripheral circuit, to release buffered trace data from the communication adaptor's trace buffer 336, and to re-initiate operation of the peripheral circuit. When the system is operating in the security mode, for example, this function may be used to permit the supervisory node to halt a peripheral circuit.

Control messages are considered not to be time-critical. Control messages received by the message receiver interface 304 are optionally routed through an input FIFO (first-in-first-out) queue 314. The control messages are decompressed 316 and then passed to an input message controller 318. Input message controller 318 performs message parsing and internal routing of the control information to other entities in the communication adaptor. If the control message is to control the operation of the peripheral circuit then that control instruction is passed by the input message controller 318 to the peripheral controller unit 320 which instructs the peripheral circuit accordingly over control and configuration interface 322. If the control message is to change the power mode or determine the status of the power mode of the peripheral circuit, then that control instruction is passed by the input message controller 318 to power management and status block 324 which instructs the peripheral circuit accordingly over power management interface 326. If the control message is to control the configuration of the communication adaptor, then the input message controller 318 passes the control instruction to trigger hub 308 which sends a trigger to the appropriate entity in the communication adaptor to change its configuration. For example, if the control message instructs the communication adaptor to change the range of values for which it is recording trace data, then the trigger hub instructs the filters 310 to make this change. If the control message instructs the communication adaptor to change the interval at which data from the peripheral circuit is sampled, then the trigger hub instructs the interval counter 328 to make this change. The interval counter then triggers the filters to sample the data from the peripheral circuit at the modified sample rate. If the control message instructs the communication adaptor to recalibrate the timing of the timer 330, then the trigger hub instructs the timer 330 to make this change.

The filters 310 are configured to perform an action in accordance with the interval counter. For example, the filters may sample the data output from the peripheral circuit when the interval counter clocks. As another example, the filters may output data to the encoder 332 when the interval counter clocks. As another example, the filters may only capture data in between one clocking of the interval counter and the next. The filters receive data from the peripheral circuit over the data monitor interface 334. The filters can be set up in several different modes. In a first mode, the filters act as a comparator, for example they only output data if it lies within a certain numerical range. In a second mode, the filters act as a matching filter in that they search for a particular sequence of data. On finding that sequence of data, the filters may send an alert to the trigger hub 308. The trigger hub may create an event message which it outputs to the message transmitter interface 306. The message transmitter interface 306 then passes this event message onto the supervisory node. Alternatively, the communication interface may be configured to alter its own configuration when the filter detects the sequence of data. For example, the communication interface may be configured to sample the data output from the peripheral circuit at a higher frequency rate on detecting the sequence of data.

The filters 310 pass the captured data on to the encoder 332. The encoder reformats the data into data messages. The encoder may also analyse the data and apply performance counters. The encoder time stamps the messages it creates using the time from timer 330. The encoder 332 outputs trace data messages to trace buffer 336. The power mode of the encoder and of the trace buffer is controllable by power management block 324. The trace buffer 335 buffers trace data.

Control messages to be output from the communication interface are generated by output message controller 338. An instruction to be incorporated into a control message is received by the output message controller 338 from the input message controller, the peripheral controller unit or the power management module. The output message controller time stamps each message that it creates using the time from timer 330.

Message arbiter 340 selects a message to output from the communication interface, the message selected from the control messages at the output message controller and the trace messages at the trace buffer. The selected message is compressed 342. The output message may then be buffered at output buffer 344. The message is then transmitted to the supervisory node by message transmitter interface 306.

The peripheral circuit 302 comprises registers and internal state 346 which may be accessible by the communication interface. For example, the peripheral controller unit 320 may be configured to read register values and/or record the current state of the peripheral circuit.

The interfaces 322, 326, 312 and 334 are arranged in hardware so that they link to the appropriate elements in the peripheral circuit in order that the requisite data is received by the communication interface 300 and in order that signals transmitted by the communication interface 300 to the peripheral circuit will have the desired effect. The manner of those connections will vary depending on the design of the peripheral circuit.

The integrated circuit may have other peripheral circuits that are not served by any communication interface. A communication interface may service multiple peripheral circuits.

FIG. 4 shows an alternative arrangement for interconnecting the communication interfaces and the supervisory node 122. In this example, instead of the supervisory node serving as a hub, the communication interfaces 108, 110, 112, 118, 120 are coupled to a bus 140 to which the supervisory node is also coupled. Communications between those entities are carried over the bus 140.

Communications from off the integrated circuit can be addressed to the access controller 124. In order to maintain the integrity of such communications they are preferably provided with information permitting them to be authenticated by the access controller. For example, a communication may comprise a field that has been generated as a cryptographic function of content of the communication and a private key, allowing the communication to be authenticated using a corresponding cryptographic function and a corresponding public key which is stored by the access controller. Public/private key authentication protocols of this nature are well known. The access controller can be configured to implement the received communication only if it is successfully authenticated. The access controller may be responsive to a received communication to adapt its configuration as specified in the received communication. Alternatively, the access controller may be configured when the integrated circuit is manufactured and may be arranged so that it is then incapable of subsequent reconfiguration. Once the access controller has been configured it communicates with the supervisory node and the communication adaptors to configure them in a manner defined in its own configuration: for example by setting up their triggers, filters and actions. The supervisory node and the communication adaptors are arranged so that their configurations can only be changed on command from the access controller. Thus the access controller serves to configure the monitoring system and maintain its security.

In operation for debugging, the access controller is configured with a definition of the triggers, filters and other definitions that will be used to identify the debug information that is sought, and to indicate how that information should be handled. That configuration may be supplied by a source external to the integrated circuit or by a source on the integrated circuit. For example, at initialisation the access controller could read its configuration from non-volatile memory on the integrated circuit. The access controller then propagates those definitions to the supervisory node and the communication adaptors, and they implement the debugging strategy as the integrated circuit runs. Since the architecture of the debugging mechanism is overlain on the normal operational hardware of the integrated circuit it makes little or no impact on the performance of the integrated circuit.

The operation of the integrated circuit in the security mode will now be discussed in more detail.

First, the access controller is configured by an external source. That may happen at manufacture of the integrated circuit, or subsequently. Preferably, the configuration is stored in memory that is physically dedicated to the access controller, so that only the access controller can access it. Alternatively, it may be stored in memory external to the access controller, in which case it is preferred that the external memory comprises an area logically dedicated to the access controller, to prevent other hardware entities or processes from changing the access controller's configuration. The memory in which the access controller's configuration is stored may be non-volatile memory, so that the configuration can be preserved when the integrated circuit is powered down. Preferably the access controller cryptographically authenticates any message communicating a change of configuration, and implements the change of configuration only if the message is so authenticated. The configuration of the access controller may comprise data defining configuration to be propagated to the supervisory node and/or the communication adaptors in order to enable them to perform security-related functions. Once the access controller is configured it propagates the appropriate elements of the configuration to the supervisory node and the communication adaptors. Then, when the integrated circuit is in operation the supervisory node and the communication adaptors monitor communications in accordance with their configuration. Their configurations may comprise triggers and, for each trigger one or more actions that are to be performed when the trigger matches a communication or state.

The definition represented by a trigger may be a combination of any one or more of the following:
1. The peripheral circuit or processing context that is the source of a message matching a definition of one or more sources.
2. The peripheral circuit or off-chip address (e.g. an IP address) that is the destination of a message matching a definition of one or more destinations.

3. The traffic data content of a message matching a predetermined definition.
4. A message of a specific type being detected subsequent to one or more other messages of a specific type. This trigger may be implemented at a communication adapter if the messages are to or from a single peripheral circuit. Alternatively, a communication adapter may be configured to alert the supervisory node when one of a chain of messages is detected, and the supervisory node may be configured to take action when it has been informed by multiple communication adapters that all the messages of that chain have been detected.
5. More than a threshold number of messages of a specific type being detected within a predefined period of time.
6. A peripheral circuit having a predetermined state.

Practical examples of the circumstances targeted by some triggers are as follows:

1. An attempt by one peripheral circuit to read or write data in an area of memory to which that circuit is not permitted access. This trigger comprises a source definition (indicating the peripheral circuit making the read or write request) and a destination definition (indicating the target of the read or write request). It may comprise a definition relating to the content of the message, for example to match the fact of the message being a read or write request. A trigger of this type may be used generally to detect an attempt by a peripheral circuit to exceed its access privileges, or to detect an unauthorised leak of data to an external destination.
2. An attempt by any peripheral circuit to access a restricted area of the system: for example an area of memory where the configuration of the access controller is stored, an area of memory containing a secret cryptographic key or an area of memory storing virus definitions. This trigger comprises a destination definition (indicating the restricted area of memory). A trigger of this type may be used to protect security-critical elements of the integrated circuit from tampering.
3. An excessive rate of access to a resource: for example an attempt to transmit messages or to read or write data at greater than a predefined rate. This trigger comprises a definition of the access message: for example its source or destination or the type of access; and a definition of the rate: for example more than a defined number of access in a defined unit of time. A trigger of this type may be used to detect denial-of-service attacks, or bugs resulting in excessive consumption of resources.
4. The firmware state of a peripheral circuit not matching a predetermined format: for example not being capable of being authenticated according to an authentication algorithm.
5. An attempt by a process running on a peripheral circuit to access resources that are not allowed to be accessed by that process. The nature of the process may be determined from the state of the peripheral circuit. In one example, the trigger may be dependent on the context in which the process is running, which may be detected from the state of the peripheral circuit. The trigger may be matched if a process in that context attempts to access resources that are not permitted to be accessed by that context.

The actions configured for the supervisory node and/or a communication adaptor may be any one or more of the following:

1. To block the message that met the corresponding trigger criterion, so as to prevent it reaching its destination.
2. To transmit a message to an external destination indicating that the corresponding trigger criterion has been met. That message could, for example, be directed over a public network such as the internet to a monitoring station. In this case it is preferable for the message to be suitably secured, for example by encryption.
3. To cause the device in which the chip is installed to present an alert to its user, for example as an on-screen message or an audible tone.
4. To disable part or all of the integrated circuit, either temporarily or permanently. The integrated circuit may be disabled by halting its clock or withdrawing power to one or more portions of the circuit. The integrated circuit may then be re-enabled when it is turned off and back on again, or only when the configuration of the access controller has been altered to permit it to operate again. The latter approach permits the circuit to be disabled until an operator who can authenticate to the access controller has re-enabled it. When only a part of the integrated circuit is disabled, other portions of the circuit may remain enabled.
5. To store a log of the event that met the trigger criterion, for example in memory of the supervisory node.
6. To write data to an area of memory of the integrated circuit that is accessible by an application running on the integrated circuit. This route permits the hardware monitoring system to alert the application level to a security event. The application may be configured to repeatedly read the area of memory or to use another mailbox mechanism so as to identify that the alert has arisen. The application may be configured to, in response to identifying that the alert has arisen, alert a user with information identifying the security event has been written there.
7. To automatically adopt to a default configuration, for example by loading a fall-back version of an operating system, supervisory system or other configuration that is stored in non-volatile memory on the integrated circuit. This approach enables the integrated circuit to automatically revert to a trusted configuration if a transaction indicative of an insecure state has been detected.
8. To alter the message that met the trigger criterion in accordance with a predetermined algorithm.
9. To transmit a message to a hardware unit located on the integrated circuit or to a software entity being executed on the integrated circuit. That entity could, for example, be a hypervisor.

One particularly secure approach is for the security system constituted by the supervisory node and/or a communication adaptor to assess each command, or a subset of commands, before they are executed, and to allow a command to be implemented only if it is not considered to be an insecure command. However, this approach can reduce the speed of execution. A preferred approach is for commands to be assessed for security in parallel with their being executed, or after they have been executed, and for the security system to implement a suitable failure mode if an insecure command is identified. In this approach, the command stream from a core node is passed for execution as normal, and whilst the command is leaving the core entity it is assessed by the communication adapter of that core node to determine whether it matches a filter that has been set. If it does match the filter then information indicative of the command is passed to the supervisory node. The supervisory node then assesses the command for security as described above. Preferably the supervisory node is configured so that if the command is determined to be insecure then in response to that determination it performs one or more of the following actions:
1. Blocking the execution of future commands from the core node that issued the command. This may limit further security risks from arising.
2. Restricting communications from the integrated circuit to a predetermined destination or class of destinations. This may prevent data leaking from the integrated circuit.
3. Restricting modification of all or a predetermined area of memory accessible to the integrated circuit. This may restrict memory corruption arising from the security risk, for example by firmware or user data being modified.

In order to implement some of these actions the communication adaptors need to have appropriate means of authority on the integrated circuit. This can be provided by the configuration and control interface 322 and by the power management interface 326.

The security system may be capable of implementing memory striping. To implement this function the security system stores a mapping defining for some or all operational entities on the integrated circuit a set of memory locations that that entity is permitted to access. Then when an entity issues a command attempting to access a memory location the security system checks whether the entity is permitted to access that location according to the stored mapping, and if it is not permitted to access the location then the security system blocks that access, raises an alert or disables functionality of the integrated circuit. This approach permits memory striping to be implemented without the need for it to be supported in a memory controller.

A communication adapter may be capable of reconfiguring, via control interface 322 the operation of its peripheral circuit. This may be done to implement one of the triggers described above. It may also be done to implement scrambling of on-chip or external memory for security purposes. The system may store (e.g. in memory of the supervisory node) a table mapping memory addresses as viewed by the peripheral circuits to external memory addresses. For example, a memory address 0x3F8E1232 as viewed by the peripheral circuits can be mapped in the table to an external memory address 0x9EE7AB11. A communication adapter may reconfigure a peripheral circuit so that when the peripheral circuit performs a read or write access to the memory the target of the request is re-mapped in accordance with the table stored in the supervisory node. The message is then forwarded towards its destination. This mechanism allows the external memory locations being used by the system to be reordered so as to obfuscate the data that is being stored, and thereby inhibit a malicious process from reading or changing the stored data to achieve a desired result. Instead of using a look-up table to map the memory addresses as seen locally to external memory addresses the mapping could itself be algorithmic. There could be other layers of re-mapping between the integrated circuit and the memory, so the external memory address need not be a true physical memory address.

The system may be configured to implement checks from time to time on the integrity of the system that are independent of individual message flows. For example, the shared hub or the communication adaptor serving a peripheral circuit may be configured to read the state of the peripheral circuit and compare that configuration against predetermined valid and or/invalid configurations. One way in which this may be done is to cryptographically verify the configuration of the peripheral circuit to ensure that it has been validly cryptographically signed with a trusted certificate. Another approach is to check the configuration for the presence of patterns known to be characteristic of malicious software. If the configuration fails the cryptographic authentication or contains a suspicious pattern then one of the actions listed above can be taken. Another form of periodic check is to establish the external environment of the integrated circuit, compare that with a permitted environmental definition that is part of the configuration of the monitoring system, and if the two do not match to take one of the actions listed above. Examples of the external environment that may be defined include:
1. the physical location of the integrated circuit as determined by a satellite or other positioning system which may be on the integrated circuit or external to it—thus the integrated circuit may be disabled or raise an alert if it is at an unauthorised location;
2. the set of peripheral devices to which the integrated circuit is connected—thus the integrated circuit may be disabled until a set of required peripherals have been connected to it, or if an additional peripheral (which might be being used to analyse the internal structure of the integrated circuit) is connected to it;
3. the capabilities of the peripheral devices to which the integrated circuit is connected—thus a communication interface of the integrated circuit can be disabled if it is connected to a peripheral that is not compatible with or authorised for use with the interface.

The monitoring system may be configured with a trigger that corresponds to an attempt to update the software or firmware running on a part of the integrated circuit, to authenticate that software (e.g. using a cryptographic function) and to block the installation or execution of that software if it fails the authentication test. In this way, the monitoring system can be used to ensure that only authorised software and firmware is run or installed on the integrated circuit.

The security system may be configured to detect a range of circumstances that are indicative of directly or indirectly insecure operation. An example of a directly insecure operation may be an attempt by an entity on the integrated circuit to access a memory location it is forbidden to access. An indirectly insecure operation may be one that is not expressly forbidden but that is indicative of some unwanted operation, for example an attempt by one entity to access an area of memory that has never been written to, or to access a peripheral that is not attached. These forms of operation may be indicative of bugs or configuration errors. In general, the security system may be configured to store and detect activity that is rogue, undesired, in accordance with one or more stored definitions of undesirable activity pre-stored on the integrated circuit or not in accordance with one or more definitions of permitted activity pre-stored on the integrated circuit.

Since the architecture of the debugging mechanism is overlain on the normal operational hardware of the integrated circuit it makes little or no impact on the performance of the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An integrated circuit having a security supervision system, the integrated circuit comprising:
   a plurality of functional circuit blocks mutually interconnected so as to be capable of collectively performing data processing tasks;
   one or more communication adaptors, the one or more communication adaptors each having: (i) a hardware interconnection to at least one of the plurality of functional circuit blocks, whereby the communication adaptor is capable of sensing the state and/or activity of the at least one of the plurality of functional circuit blocks; (ii) memory configured to store definitions of state and/or activity of the at least one of the plurality of functional circuit blocks and actions corresponding to each definition; and (iii) processing circuitry configured to compare the state and/or activity of the at least one of the plurality of functional circuit blocks with each definition in parallel with the execution of a command from the said at least one of the plurality of functional circuit blocks, the processing circuitry being configured to, when state and/or activity of the at least one of the plurality of functional circuit blocks corresponding to a stored definition is detected, perform the corresponding action;
   the memory being configured to store a definition of state and/or activity characteristic of insecure operation of the at least one of the plurality of functional circuit blocks and a corresponding action that is one of (i) at least partially disabling the at least one of the plurality of functional circuit blocks and (ii) causing a message to be transmitted; and
   wherein the integrated circuit further comprises an access controller, the access controller being capable of configuring the memory of a communication adaptor, and being arranged to:
   receive a command to configure the memory of a communication adaptor with a configuration comprising a definition of state and/or activity characteristic of insecure operation of the at least one of the plurality of functional circuit blocks and a corresponding action;
   attempt to authenticate that command; and
   configure the memory of the communication adaptor only if the command is successfully authenticated.

2. The integrated circuit of claim 1, wherein the processing circuitry of the one or more communication adaptors is implemented in hardware operating in a separate clock domain to the at least one of the plurality of functional circuit blocks to which the communication adaptor is connected.

3. The integrated circuit of claim 1, wherein the processing circuitry of the communication adaptor is implemented in separate hardware from the plurality of functional circuit blocks.

4. The integrated circuit of claim 3, wherein the processing circuitry of the communication adaptor is implemented in hardware that is distinct from any hardware on which arbitrary software can run.

5. The integrated circuit of claim 1, wherein the access controller is arranged to decrypt the command.

6. The integrated circuit of claim 1, the integrated circuit being configured so that the memory of the communication adaptor is configurable only by the access controller.

7. The integrated circuit of claim 1, wherein the integrated circuit is arranged to encrypt the message.

8. The integrated circuit of claim 1, wherein the plurality of functional circuit blocks comprise one or more of a microprocessor, a memory and a communication interface.

9. The integrated circuit of claim 1, wherein each of the plurality of functional circuit blocks is one or more of a microprocessor, a memory and a communication interface.

10. The integrated circuit of claim 1, wherein the state and/or activity characteristic of insecure operation of the at least one of the plurality of functional circuit blocks is an attempt to read or write a memory location identified by a predetermined logic.

11. The integrated circuit of claim 1, wherein the state and/or activity characteristic of insecure operation of the at least one of the plurality of functional circuit blocks is an attempt by a process having a predetermined characteristic to read or write a predetermined memory location.

12. The integrated circuit of claim 1, wherein the state and/or activity characteristic of insecure operation of the at least one of the plurality of functional circuit blocks is that software stored for execution on the at least one of the plurality of functional circuit blocks matches or fails to match one or more predetermined criteria.

13. The integrated circuit of claim 1, wherein the state and/or activity characteristic of insecure operation of the at least one of the plurality of functional circuit blocks is that the environment of the integrated circuit matches or fails to match one or more predetermined criteria.

14. The integrated circuit of claim 1, wherein the integrated circuit stores data associating at least one memory area with at least one process capable of being supported by the at least one of the plurality of functional circuit blocks, and the state and/or activity characteristic of insecure operation of the at least one of the plurality of functional circuit blocks is an attempt by such a process to read or write to that memory area.

15. The integrated circuit of claim 1, wherein the memory is configured to store a definition of state and/or activity characteristic of secure operation of the at least one of the plurality of functional circuit blocks and a corresponding action that is to log activity of the at least one of the plurality of functional circuit blocks subsequent to that action.

16. An integrated circuit having a security supervision system, the integrated circuit comprising:
   a plurality of functional circuit blocks mutually interconnected so as to be capable of collectively performing data processing tasks;
   one or more communication adaptors having a hardware interconnection to at least one of the plurality of functional circuit blocks, whereby the one or more communication adaptors is capable of sensing the state and/or activity of the at least one of the plurality of functional circuit blocks; and
   a supervisory node coupled for communication with each of the one or more communication adaptors to receive messages from the one or more communication adaptors indicative of the state and/or activity of the plurality of functional circuit blocks, the supervisory node comprising (i) memory configured to store definitions of the state and/or activity of the at least one of the plurality of functional circuit blocks and actions corresponding to each definition; and (ii) processing circuitry configured to compare the state and/or activity indicated by the messages with each definition in parallel with the execution of a command from the said at least one of the plurality of functional circuit blocks, the processing circuitry being configured to, when it detects that state and/or activity indicated by the messages corresponds to a stored definition, perform the corresponding action;

the memory being configured to store a definition of state and/or activity characteristic of insecure operation of the plurality of functional circuit blocks and a corresponding action that is one of (i) at least partially disabling one or more of the plurality of functional circuit blocks and (ii) causing a message to be transmitted;

wherein the integrated circuit further comprises an access controller, the access controller being capable of configuring the memory of the supervisory node, and being arranged to:

receive a command to configure the memory of the supervisory node with a configuration comprising a definition of state and/or activity characteristic of insecure operation of the at least one of the plurality of functional circuit blocks and a corresponding action;

attempt to authenticate that command; and configure the memory of the supervisory node only if the command is successfully authenticated.

* * * * *